United States Patent
Chen et al.

(10) Patent No.: US 10,641,992 B2
(45) Date of Patent: May 5, 2020

(54) CAMERA OPTICAL LENS

(71) Applicant: AAC Technologies Pte. Ltd., Singapore (SG)

(72) Inventors: Chenxiyang Chen, Shenzhen (CN); Lei Zhang, Shenzhen (CN); Yanmei Wang, Shenzhen (CN); Yi Ji, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 168 days.

(21) Appl. No.: 15/871,155

(22) Filed: Jan. 15, 2018

(65) Prior Publication Data
US 2019/0187433 A1 Jun. 20, 2019

(30) Foreign Application Priority Data

Dec. 18, 2017 (CN) .......................... 2017 1 1365640
Dec. 18, 2017 (CN) .......................... 2017 1 1367153

(51) Int. Cl.
*G02B 13/00* (2006.01)
*G02B 9/64* (2006.01)
*G02B 1/04* (2006.01)

(52) U.S. Cl.
CPC ......... *G02B 13/0045* (2013.01); *G02B 1/041* (2013.01); *G02B 9/64* (2013.01)

(58) Field of Classification Search
CPC ............ G02B 13/0045; G02B 13/0015; G02B 13/001; G02B 13/18; G02B 13/24;
(Continued)

(56) References Cited

U.S. PATENT DOCUMENTS 3,132,199 A * 5/1964 Hermanni .............. G02B 13/04
359/755
9,348,113 B2 * 5/2016 Tang ........................ G02B 9/64
(Continued)

FOREIGN PATENT DOCUMENTS

CN          106950681 A1    7/2017
TW          104132949 A1    2/2016

OTHER PUBLICATIONS

Lohmann, Adolf W. "Scaling Laws for Lens Systems." Applied Optics, vol. 28, No. 23, Dec. 1, 1989, pp. 4996-4998 (Year: 1989).*
(Continued)

*Primary Examiner* — Marin Pichler
(74) *Attorney, Agent, or Firm* — IPro, PLLC; Na Xu

(57) ABSTRACT

The present disclosure relates to optical lens, in particular to a camera optical lens. The camera optical lens includes, in an order from an object side to an image side, a first lens, a second lens, a third lens, a fourth lens, a fifth lens, a sixth lens and a seventh lens. The first lens is made of plastic material, the second lens is made of glass material, the third lens is made of plastic material, the fourth lens is made of glass material, the fifth lens is made of plastic material, the sixth lens is made of plastic material, and the seventh lens is made of plastic material. The camera optical lens satisfies the following conditions: $1 \leq f1/f \leq 1.5$; $1.7 \leq n2 \leq 2.2$; $-2 \leq f3/f4 \leq 2$; $0.5 \leq (R13+R14)/(R13-R14) \leq 10$; and $1.7 \leq n4 \leq 2.2$. The camera optical lens can obtain high imaging performance and a low TTL (Total Track Length).

19 Claims, 7 Drawing Sheets

(58) Field of Classification Search
CPC ........ G02B 9/64; G02B 9/62; G02B 27/0025;
G02B 27/005; G02B 14/177; G02B 1/041
USPC ................ 359/708, 713, 751, 755, 754, 682
See application file for complete search history.

(56) References Cited

U.S. PATENT DOCUMENTS

2015/0009578 A1* 1/2015 Shinohara ................ G02B 9/64
359/708
2016/0033743 A1 2/2016 Chen

OTHER PUBLICATIONS

1st Office Action dated Jul. 4, 2019 by CNIPA in related Chinese Patent Application No. 201711365640.2 (13 Pages).
1st Office Action dated Apr. 16, 2019 by CNIPA in related Chinese Patent Application No. 201711367153.X(15 Pages).
1st Office Action dated Jul. 18, 2019 by JPO in related Chinese Patent Application No. 2018008357(13 Pages).

* cited by examiner

CAMERA OPTICAL LENS

CROSS-REFERENCE TO RELATED APPLICATIONS

This application claims the priority benefit of Chinese Patent Applications Ser. No. 201711365640.2 and Ser. No. 201711367153.X filed on Dec. 18, 2017, the entire content of which is incorporated herein by reference.

FIELD OF THE PRESENT DISCLOSURE

The present disclosure generally relates to optical lens, in particular to a camera optical lens suitable for handheld devices such as smart phones and digital cameras and imaging devices such as monitors and PC lens.

DESCRIPTION OF RELATED ART

With the emergence of smart phones in recent years, the demand for miniature camera lens is increasing day by day, but the photosensitive devices of general camera lens are no other than Charge Coupled Device (CCD) or Complementary metal-Oxide Semiconductor Sensor (CMOS sensor), and as the progress of the semiconductor manufacturing technology makes the pixel size of the photosensitive devices shrink, coupled with the current development trend of electronic products being that their functions should be better and their shape should be thin and small, miniature camera lens with good imaging quality therefor has become a mainstream in the market. In order to obtain better imaging quality, the lens that is traditionally equipped in mobile phone cameras adopts a three-piece or four-piece lens structure. And, with the development of technology and the increase of the diverse demands of users, and under this circumstances that the pixel area of photosensitive devices is shrinking steadily and the requirement of the system for the imaging quality is improving constantly, the five-piece, six-piece and seven-piece lens structure gradually appear in lens design. There is an urgent need for ultra-thin wide-angle camera lenses which have good optical characteristics and the chromatic aberration of which is fully corrected.

SUMMARY

In respect to the above problem, an object of the present disclosure is to provide a camera optical lens which can achieve both high imaging performance and ultrathinness and a wide angle.

To solve the above problem, an embodiment of the present disclosure provides a camera optical lens. The camera optical lens comprises, in an order from an object side to an image side: a first lens, a second lens, a third lens, a fourth lens, a fifth lens, a sixth lens and a seventh lens.

The first lens is made of plastic material, the second lens is made of glass material, the third lens is made of plastic material, the fourth lens is made of glass material, the fifth lens is made of plastic material, the sixth lens is made of plastic material, and the seventh lens is made of plastic material;

where the camera optical lens further satisfies the following conditions:

$1 \leq f1/f \leq 1.5$;

$1.7 \leq n2 \leq 2.2$;

$-2 \leq f3/f4 \leq 2$;

$0.5 \leq (R13+R14)/(R13-R14) \leq 10$; and, $1.7 \leq n4 \leq 2.2$;

Where f is the focal length of the camera optical lens; f1 is the focal length of the first lens; f3 is the focal length of the third lens; f4 is the focal length of the fourth lens; n2 is the refractive power of the second lens; n4 is the refractive power of the fourth lens; R13 is the curvature radius of object side surface of the seventh lens; R14 is the curvature radius of image side surface of the seventh lens.

Compared with existing technologies, with above lens configuration, the embodiment of the present disclosure may combine lens that have a special relation in terms of the data of focal length, refractive index, an optical length of the camera optical lens, thickness on-axis and curvature radius so as to enable the camera optical lens to achieve ultrathinness and a wide angle while obtaining high imaging performance.

In one example, the camera optical lens further satisfies the following conditions: $1.08 \leq f1/f \leq 1.46$; $1.71 \leq n2 \leq 2.08$; $-1.77 \leq f3/f4 \leq 0.55$; $0.55 \leq (R13+R14)/(R13-R14) \leq 5.47$; and $1.72 \leq n4 \leq 2.01$.

In one example, the first lens has a positive refractive power with a convex object side surface and a concave image side surface relative to the proximal axis; the camera optical lens further satisfies the following conditions: $-4.72 \leq (R1+R2)/(R1-R2) \leq -1.30$; and $0.27 \leq d1 \leq 0.90$; where R1 is the curvature radius of object side surface of the first lens; R2 is the curvature radius of image side surface of the first lens; and d1 is the thickness on-axis of the first lens.

In one example, the camera optical lens further satisfies the following conditions: $-2.95 \leq (R1+R2)/(R1-R2) \leq -1.62$; and $0.44 \leq d1 \leq 0.72$.

In one example, the second lens has a negative refractive power with a convex object side surface and a concave image side surface relative to the proximal axis; the camera optical lens further satisfies the following conditions: $-21.45 \leq f2/f \leq -2.40$; $3.97 \leq (R3+R4)/(R3-R4) \leq 15.46$; and $0.13 \leq d3 \leq 0.56$; where f is the focal length of the camera optical lens; f2 is the focal length of the second lens; R3 is the curvature radius of the object side surface of the second lens; R4 is the curvature radius of the image side surface of the second lens; and d3 is the thickness on-axis of the second lens.

In one example, the camera optical lens further satisfies the following conditions: $-13.41 \leq f2/f \leq -3.0$; $6.36 \leq (R3+R4)/(R3-R4) \leq 12.37$; and $0.20 \leq d3 \leq 0.45$.

In one example, the third lens has a negative refractive power with a concave object side surface relative to the proximal axis; wherein the camera optical lens further satisfies the following conditions: $-13.30 \leq f3/f \leq -2.47$; $-5.12 \leq (R5+R6)/(R5-R6) \leq 2.27$; and $0.16 \leq d5 \leq 0.71$; where f is the focal length of the camera optical lens; f3 is the focal length of the third lens; R5 is the curvature radius of the object side surface of the third lens; R6 is the curvature radius of the image side surface of the third lens; and d5 is the thickness on-axis of the third lens.

In one example, the camera optical lens further satisfies the following conditions: $-8.31 \leq f3/f \leq -3.09$; $-3.20 \leq (R5+R6)/(R5-R6) \leq 1.82$; and $0.26 \leq d5 \leq 0.57$.

In one example, the fourth lens has a positive refractive power with a convex object side surface and a concave image side surface relative to the proximal axis; the camera optical lens further satisfies the following conditions: $1.54 \leq f4/f \leq 7.03$; $-116.54 \leq (R7+R8)/(R7-R8) \leq 6.48$; and $0.10 \leq d7 \leq 0.49$; where f is the focal length of the camera optical lens; f4 is the focal length of the fourth lens; R7 is the curvature radius of the object side surface of the fourth lens; R8 is the curvature radius of the image side surface of the fourth lens; and d7 is the thickness on-axis of the fourth lens.

In one example, the camera optical lens further satisfies the following conditions: $2.46 \leq f4/f \leq 5.62$; $-72.84 \leq (R7+R8)/(R7-R8) \leq 5.19$; and $0.16 \leq d7 \leq 0.39$.

In one example, the fifth lens has a positive refractive power with a concave object side surface and a convex image side surface relative to the proximal axis; the camera optical lens further satisfies the following conditions: $0.32 \leq f5/f \leq 1.02$; $0.66 \leq (R9+R10)/(R9-R10) \leq 3.65$; and $0.42 \leq d9 \leq 1.32$; where f is the focal length of the camera optical lens; f5 is the focal length of the fifth lens; R9 is the curvature radius of the object side surface of the fifth lens; R10 is the curvature radius of the image side surface of the fifth lens; d9 is the thickness on-axis of the fifth lens.

In one example, the camera optical lens further satisfies the following conditions: $0.52 \leq f5/f \leq 0.82$; $1.05 \leq (R9+R10)/(R9-R10) \leq 2.92$; $0.67 \leq d9 \leq 1.06$.

In one example, the sixth lens has a negative refractive power with a concave image side surface relative to the proximal axis; the camera optical lens further satisfies the following conditions: $-7.35 \leq f6/f \leq -1.30$; $0.20 \leq (R11+R12)/(R11-R12) \leq 3.44$; and $0.20 \leq d11 \leq 0.67$; where f is the focal length of the camera optical lens; f6 is the focal length of the sixth lens; R11 is the curvature radius of the object side surface of the sixth lens; R12 is the curvature radius of the image side surface of the sixth lens; and d11 is the thickness on-axis of the sixth lens.

In one example, the camera optical lens further satisfies the following conditions: $-4.59 \leq f6/f \leq -1.62$; $0.32 \leq (R11+R12)/(R11-R12) \leq 2.76$; and $0.32 \leq d11 \leq 0.54$.

In one example, the seventh lens has a negative refractive power with a concave object side surface and a concave image side surface relative to the proximal axis; the camera optical lens further satisfies the following conditions: $-1.76 \leq f7/f \leq -0.46$; and $0.15 \leq d13 \leq 0.52$; where f is the focal length of the camera optical lens; f7 is the focal length of the seventh lens; and d13 is the thickness on-axis of the seventh lens.

In one example, the camera optical lens further satisfies the following conditions: $-1.10 \leq f7/f \leq 0.24 \leq d13 \leq 0.42$.

In one example, the total optical length TTL of the camera optical lens is less than or equal to 5.60 mm In one example, the total optical length TTL of the camera optical lens is less than or equal to 5.35 mm In one example, the aperture F number of the camera optical lens is less than or equal to 1.83.

In one example, the aperture F number of the camera optical lens is less than or equal to 1.80.

An effect of the present disclosure is that the camera optical lens has excellent optical properties and a wide angle. The camera optical lens is ultra-thin, and its chromatic aberration is fully corrected. The camera optical lens is particularly suitable for a camera lens assembly of mobile phone and WEB camera lens that form by imaging elements, such as CCD and CMOS, with high pixels.

DETAILED DESCRIPTION OF THE EXEMPLARY EMBODIMENTS

To make the objects, technical solutions, and advantages of the present disclosure clearer, the following describes the embodiments of the present disclosure in detail with reference to the accompanying drawings. A person of ordinary skill in the related art can understand that, in the embodiments of the present disclosure, many technical details are provided to make readers better understand this application. However, even without these technical details and any changes and modifications based on the following embodiments, technical solutions required to be protected by this application can be implemented.

Embodiment 1

Figure 1:
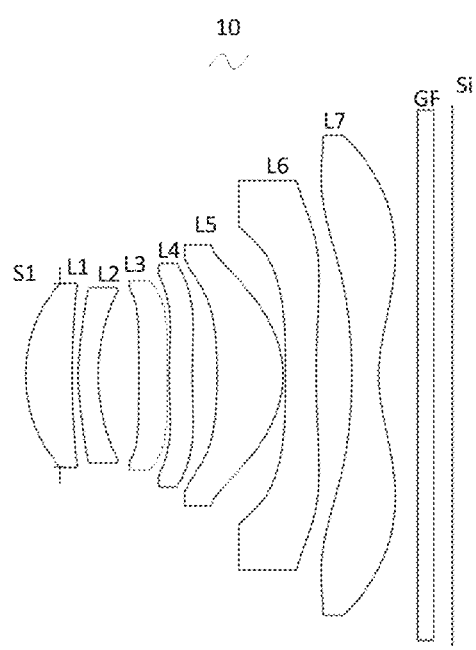
FIG. 1 is a schematic diagram of a camera optical lens in accordance with a first embodiment of the present invention.

As referring to the accompanying drawings, the present invention provides a camera optical lens 10. FIG. 1 shows the camera optical lens 10 of embodiment 1 of the present invention, the camera optical lens 10 comprises 7 lenses. Specifically, from the object side to the image side, the camera optical lens 10 comprises in sequence: an aperture S1, a first lens L1, a second lens L2, a third lens L3, a fourth lens L4, a fifth lens L5, a sixth lens L6 and a seventh lens L7. Optical element like optical filter GF can be arranged between the seventh lens L7 and the image surface Si.

The first lens L1 is made of plastic material, the second lens L2 is made of glass material, the third lens L3 is made of plastic material, the fourth lens L4 is made of glass material, the fifth lens L5 is made of plastic material, the sixth lens L6 is made of plastic material, the seventh lens L7 is made of plastic material.

Here, the focal length of the whole camera optical lens 10 is defined as f, the focal length of the first lens is defined as f1. The camera optical lens 10 further satisfies the following condition: $1 \leq f1/f \leq 1.5$, which fixes the positive refractive power of the first lens L1. If the lower limit of the set value is exceeded, although it benefits the ultra-thin development of lenses, the positive refractive power of the first lens L1 will be too strong, problem like aberration is difficult to be corrected, and it is also unfavorable for wide-angle development of lens. On the contrary, if the upper limit of the set value is exceeded, the positive refractive power of the first lens L1 becomes too weak, it is then difficult to develop ultra-thin lenses. In one example, the following condition shall be satisfied, $1.08 \leq f1/f \leq 1.46$.

The refractive power of the second lens L2 is defined as n2. Here the following condition should be satisfied: $1.7 \leq n2 \leq 2.2$. This condition fixes the refractive power of the second lens L2, and refractive power within this range benefits the ultra-thin development of lenses, and it also benefits the correction of aberration. In one example, the following condition shall be satisfied, $1.71 \leq n2 \leq 2.08$.

The focal length of the third lens L3 is defined as f3, and the focal length of the fourth lens L4 is defined as f4. The following condition should be satisfied: $-2 \leq f3/f4 \leq 2$, which fixes the ratio between the focal length f3 of the third lens L3 and the focal length f4 of the fourth lens L4. A ratio within this range can effectively reduce the sensitivity of lens group used in camera and further enhance the imaging quality. In one example, the following condition shall be satisfied, $-1.77 \leq f3/f4 \leq 0.55$.

The curvature radius of the object side surface of the seventh lens L7 is defined as R13, the curvature radius of the image side surface of the seventh lens L7 is defined as R14. The following condition should be satisfied: $0.5 \leq (R13+R14)/(R13-R14) \leq 10$, which fixes the shape of the seventh lens L7, when the value is beyond this range, with the development into the direction of ultra-thin and wide-angle lenses, problem like aberration of the off-axis picture angle is difficult to be corrected. In one example, the condition: $0.55 \leq (R13+R14)/(R13-R14) \leq 5.47$ shall be satisfied.

The refractive power of the fourth lens L4 is defined as n4. Here the following condition should be satisfied: $1.7 \leq n4 \leq 2.2$. This condition fixes the refractive power of the fourth lens L4, and refractive power within this range benefits the ultra-thin development of lenses, and it also benefits the correction of aberration. In one example, the following condition shall be satisfied, $1.72 \leq n4 \leq 2.01$.

When the focal length of the camera optical lens 10 of the present invention, the focal length of each lens, the refractive power of the related lens, and the total optical length, the thickness on-axis and the curvature radius of the camera optical lens satisfy the above conditions, the camera optical lens 10 has the advantage of high performance and satisfies the design requirement of low TTL.

In this embodiment, the object side surface of the first lens L1 is a convex surface relative to the proximal axis, its image side surface is a concave surface relative to the proximal axis, and it has a positive refractive power.

The curvature radius of the object side surface of the first lens L1 is defined as R1, the curvature radius of the image side surface of the first lens L1 is defined as R2. The following condition should be satisfied: $-4.72 \leq (R1+R2)/(R1-R2) \leq -1.30$. Reasonable control of the shape of the first lens L1 enables the first lens L1 to effectively correct the spherical aberration of the system. In one example, the following condition shall be satisfied, $-2.95 \leq (R1+R2)/(R1-R2) \leq -1.62$.

The thickness on-axis of the first lens L1 is defined as d1. The condition $0.27 \leq d1 \leq 0.90$ should be satisfied. When the condition is satisfied, it is beneficial for realization of the ultra-thin lens. In one example, the condition $0.44 \leq d1 \leq 0.72$ shall be satisfied.

In this embodiment, the object side surface of the second lens L2 is a convex surface relative to the proximal axis, its image side surface is a concave surface relative to the proximal axis, and it has a negative refractive power.

The focal length of the whole camera optical lens 10 is f, the focal length of the second lens L2 is f2. The following condition should be satisfied: $-21.45 \leq f2/f \leq -2.40$. When the condition is satisfied, the negative refractive power of the second lens L2 is controlled within reasonable scope, the spherical aberration caused by the first lens L1 which has positive refractive power and the field curvature of the system then can be reasonably and effectively balanced. In one example, the condition $-13.41 \leq f2/f \leq -3.0$ should be satisfied.

The curvature radius of the object side surface of the second lens L2 is defined as R3, the curvature radius of the image side surface of the second lens L2 is defined as R4. The following condition should be satisfied: $3.97 \leq (R3+R4)/(R3-R4) \leq 15.46$, which fixes the shape of the second lens L2 and when the value is beyond this range, with the development of lenses into the direction of ultra-thin and wide-angle lenses, problem like aberration on-axis is difficult to be corrected. In one example, the following condition shall be satisfied, $6.36 \leq (R3+R4)/(R3-R4) \leq 12.37$.

The thickness on-axis of the second lens L2 is defined as d3. The condition $0.13 \leq d3 \leq 0.56$ should be satisfied. When the condition is satisfied, it is beneficial for realization of the ultra-thin lens. In one example, the condition $0.20 \leq d3 \leq 0.45$ shall be satisfied.

In this embodiment, the object side surface of the third lens L3 is a concave surface relative to the proximal axis, and it has a negative refractive power.

The focal length of the whole camera optical lens 10 is f, the focal length of the third lens L3 is f3. The following condition should be satisfied: $-13.30 \leq f3/f \leq -2.47$. When the condition is satisfied, the field curvature of the system can be reasonably and effectively balanced for further improving the image quality. In one example, the condition $-8.31 \leq f3/f \leq -3.09$ should be satisfied.

The curvature radius of the object side surface of the third lens L3 is defined as R5, the curvature radius of the image side surface of the third lens L3 is defined as R6. The following condition should be satisfied: $-5.12 \leq (R5+R6)/(R5-R6) \leq 2.27$, which is effective for shape control of the third lens L3 and beneficial for the shaping of the third lens L3, and bad shaping and stress generation due to extra large curvature of surface of the third lens L3 can be avoided. In one example, the following condition shall be satisfied, $-3.20 \leq (R5+R6)/(R5-R6) \leq 1.82$.

The thickness on-axis of the third lens L3 is defined as d5. The condition $0.16 \leq d5 \leq 0.71$ should be satisfied. When the condition is satisfied, it is beneficial for realization of the ultra-thin lens. In one example, the condition $0.26 \leq d5 \leq 0.57$ shall be satisfied.

In this embodiment, the object side surface of the fourth lens L4 is a convex surface relative to the proximal axis, its image side surface is a concave surface relative to the proximal axis, and it has a positive refractive power.

The focal length of the whole camera optical lens 10 is f, the focal length of the fourth lens L4 is f4. The following condition should be satisfied: $1.54 \leq f4/f \leq 7.03$. When the condition is satisfied, the appropriate distribution of refractive power makes it possible that the system has better imaging quality and lower sensitivity. In one example, the condition $2.46 \leq f4/f \leq 5.62$ should be satisfied.

The curvature radius of the object side surface of the fourth lens L4 is defined as R7, the curvature radius of the image side surface of the fourth lens L4 is defined as R8. The following condition should be satisfied: $-116.54 \leq (R7+R8)/(R7-R8) \leq 6.48$, which fixes the shaping of the fourth lens L4. When beyond this range, with the development into the direction of ultra-thin and wide-angle lens, the problem like chromatic aberration of the off-axis picture angle is difficult to be corrected. In one example, the following condition shall be satisfied, −72.84≤(R7+R8)/(R7−R8)≤5.19.

The thickness on-axis of the fourth lens L4 is defined as d7. The condition 0.10≤d7≤0.49 should be satisfied. When the condition is satisfied, it is beneficial for realization of the ultra-thin lens. In one example, the condition 0.16≤d7≤0.39 shall be satisfied.

In this embodiment, the object side surface of the fifth lens L5 is a concave surface relative to the proximal axis, the image side surface of the fifth lens L5 is a convex surface relative to the proximal axis. The fifth lens L5 has a positive refractive power.

The focal length of the whole camera optical lens 10 is f, the focal length of the fifth lens L5 is f5. The following condition should be satisfied: 0.32≤f5/f≤1.02, which can effectively make the light angle of the camera lens flat and reduces the tolerance sensitivity. In one example, the condition 0.52≤f5/f≤0.82 should be satisfied.

The curvature radius of the object side surface of the fifth lens L5 is defined as R9, the curvature radius of the image side surface of the fifth lens L5 is defined as R10. The following condition should be satisfied: 0.66≤(R9+R10)/(R9−R10)≤3.65, which fixes the shape of the fifth lens L5. When beyond this range, with the development into the direction of ultra-thin and wide-angle lens, the problem like chromatic aberration of the off-axis picture angle is difficult to be corrected. In one example, the following condition shall be satisfied, 1.05≤(R9+R10)/(R9−R10)≤2.92.

The thickness on-axis of the fifth lens L5 is defined as d9. The condition 0.42≤d9≤1.32 should be satisfied. When the condition is satisfied, it is beneficial for realization of the ultra-thin lens. In one example, the condition 0.67≤d9≤1.06 shall be satisfied.

In this embodiment, the image side surface of the sixth lens L6 is a concave surface relative to the proximal axis. The sixth lens L6 has a negative refractive power.

The focal length of the whole camera optical lens 10 is f, the focal length of the sixth lens L6 is f6. The following condition should be satisfied: −7.35≤f6/f≤−1.30. When the condition is satisfied, the appropriate distribution of refractive power makes it possible that the system has better imaging quality and lower sensitivity. In one example, the condition −4.59≤f6/f≤−1.62 should be satisfied.

The curvature radius of the object side surface of the sixth lens L6 is defined as R11, the curvature radius of the image side surface of the sixth lens L6 is defined as R12. The following condition should be satisfied: 0.20≤(R11+R12)/(R11−R12)≤3.44, which fixes the shape of the sixth lens L6. When beyond this range of the condition, with the development into the direction of ultra-thin and wide-angle lens, the problem like chromatic aberration of the off-axis picture angle is difficult to be corrected. In one example, the following condition shall be satisfied, 0.32≤(R11+R12)/(R11−R12)≤2.76.

The thickness on-axis of the sixth lens L6 is defined as d11. The condition 0.20≤d11≤0.67 should be satisfied. When the condition is satisfied, it is beneficial for realization of the ultra-thin lens. In one example, the condition 0.32≤d11≤0.54 shall be satisfied.

In this embodiment, the object side surface of the seventh lens L7 is a concave surface relative to the proximal axis, the image side surface of the seventh lens L7 is a concave surface relative to the proximal axis, and it has a negative refractive power.

The focal length of the whole camera optical lens 10 is f, the focal length of the seventh lens L7 is f7. The following condition should be satisfied: −1.76≤f7/f≤−0.46. When the condition is satisfied, the appropriate distribution of refractive power makes it possible that the system has better imaging quality and lower sensitivity. In one example, the condition −1.10≤f7/f≤−0.58 should be satisfied.

The thickness on-axis of the seventh lens L7 is defined as d13. The condition 0.15≤d13≤0.52 should be satisfied. When the condition is satisfied, it is beneficial for realization of the ultra-thin lens. In one example, the condition 0.24≤d13≤0.42 shall be satisfied.

In this embodiment, the total optical length TTL of the camera optical lens 10 is less than or equal to 5.60 mm, which is beneficial for the realization of ultra-thin lenses. In one example, the total optical length TTL of the camera optical lens 10 is less than or equal to 5.35 mm In this embodiment, the aperture F number of the camera optical lens 10 is less than or equal to 1.83. A large aperture has better imaging performance. In one example, the aperture F number of the camera optical lens 10 is less than or equal to 1.80.

With such design, the total optical length TTL of the whole camera optical lens 10 can be made as short as possible, thus the miniaturization characteristics can be maintained.

In the following, an example will be used to describe the camera optical lens 10 of the present invention. The symbols recorded in each example are as follows. The unit of distance, radius and center thickness is mm TTL (Total Track Length): Optical length (the distance on-axis from the object side surface of the first lens L1 to the image surface).

In one example, inflexion points and/or arrest points can also be arranged on the object side surface and/or image side surface of the lens, so that the demand for high quality imaging can be satisfied, the description below can be referred for specific implementable scheme.

The design information of the camera optical lens 10 in the first embodiment of the present invention is shown in the following, the unit of the focal length, distance, radius and center thickness is mm The design information of the camera optical lens 10 in the first embodiment of the present invention is shown in the tables 1 and 2.

TABLE 1

| | R | d | nd | vd |
|---|---|---|---|---|
| S1 | ∞ | d0 = −0.439 | | |
| R1 | 1.888 | d1 = 0.597 | nd1 1.5441 | v1 56.12 |
| R2 | 5.873 | d2 = 0.081 | | |
| R3 | 2.788 | d3 = 0.256 | nd2 1.7727 | v2 20.70 |
| R4 | 2.165 | d4 = 0.524 | | |
| R5 | −85.068 | d5 = 0.361 | nd3 1.5441 | v3 56.12 |
| R6 | 18.652 | d6 = 0.030 | | |
| R7 | 4.735 | d7 = 0.300 | nd4 1.8012 | v4 30.71 |
| R8 | 6.787 | d8 = 0.321 | | |
| R9 | −7.080 | d9 = 0.852 | nd5 1.5352 | v5 56.12 |
| R10 | −1.307 | d10 = 0.032 | | |
| R11 | −30.663 | d11 = 0.398 | nd6 1.5855 | v6 29.91 |
| R12 | 13.027 | d12 = 0.455 | | |
| R13 | −7.821 | d13 = 0.349 | nd7 1.5352 | v7 56.12 |
| R14 | 2.001 | d14 = 0.500 | | |
| R15 | ∞ | d15 = 0.210 | ndg 1.5168 | vg 64.17 |
| R16 | ∞ | d16 = 0.242 | | |

The meanings of the above symbols are as follows.

S1: Aperture;

R: The curvature radius of the optical surface, the central curvature radius in case of lens;

R1: The curvature radius of the object side surface of the first lens L1;

R2: The curvature radius of the image side surface of the first lens L1;

R3: The curvature radius of the object side surface of the second lens L2;

R4: The curvature radius of the image side surface of the second lens L2;

R5: The curvature radius of the object side surface of the third lens L3;

R6: The curvature radius of the image side surface of the third lens L3;

R7: The curvature radius of the object side surface of the fourth lens L4;

R8: The curvature radius of the image side surface of the fourth lens L4;

R9: The curvature radius of the object side surface of the fifth lens L5;

R10: The curvature radius of the image side surface of the fifth lens L5;

R11: The curvature radius of the object side surface of the sixth lens L6;

R12: The curvature radius of the image side surface of the sixth lens L6;

R13: The curvature radius of the object side surface of the seventh lens L7;

R14: The curvature radius of the image side surface of the seventh lens L7;

R15: The curvature radius of the object side surface of the optical filter GF;

R16: The curvature radius of the image side surface of the optical filter GF;

d: The thickness on-axis of the lens and the distance on-axis between the lens;

d0: The distance on-axis from aperture S1 to the object side surface of the first lens L1;

d1: The thickness on-axis of the first lens L1;

d2: The distance on-axis from the image side surface of the first lens L1 to the object side surface of the second lens L2;

d3: The thickness on-axis of the second lens L2;

d4: The distance on-axis from the image side surface of the second lens L2 to the object side surface of the third lens L3;

d5: The thickness on-axis of the third lens L3;

d6: The distance on-axis from the image side surface of the third lens L3 to the object side surface of the fourth lens L4;

d7: The thickness on-axis of the fourth lens L4;

d8: The distance on-axis from the image side surface of the fourth lens L4 to the object side surface of the fifth lens L5;

d9: The thickness on-axis of the fifth lens L5;

d10: The distance on-axis from the image side surface of the fifth lens L5 to the object side surface of the sixth lens L6;

d11: The thickness on-axis of the sixth lens L6;

d12: The distance on-axis from the image side surface of the sixth lens L6 to the object side surface of the seventh lens L7;

d13: The thickness on-axis of the seventh lens L7;

d14: The distance on-axis from the image side surface of the seventh lens L7 to the object side surface of the optical filter GF;

d15: The thickness on-axis of the optical filter GF;

d16: The distance on-axis from the image side surface of the optical filter GF to the image surface;

nd: The refractive power of the d line;

nd1: The refractive power of the d line of the first lens L1;

nd2: The refractive power of the d line of the second lens L2;

nd3: The refractive power of the d line of the third lens L3;

nd4: The refractive power of the d line of the fourth lens L4;

nd5: The refractive power of the d line of the fifth lens L5;

nd6: The refractive power of the d line of the sixth lens L6;

nd7: The refractive power of the d line of the seventh lens L7;

ndg: The refractive power of the d line of the optical filter GF;

vd: The abbe number;

v1: The abbe number of the first lens L1;

v2: The abbe number of the second lens L2;

v3: The abbe number of the third lens L3;

v4: The abbe number of the fourth lens L4;

v5: The abbe number of the fifth lens L5;

v6: The abbe number of the sixth lens L6;

v7: The abbe number of the seventh lens L7;

vg: The abbe number of the optical filter GF.

Table 2 shows the aspherical surface data of the camera optical lens 10 in the embodiment 1 of the present invention.

TABLE 2

| | Conic Index | Aspherical Surface Index | | | | | | |
|---|---|---|---|---|---|---|---|---|
| | k | A4 | A6 | A8 | A10 | A12 | A14 | A16 |
| R1 | −0.1078 | 6.3063E−03 | 1.1402E−02 | −8.3356E−03 | 5.6202E−03 | 1.1671E−03 | −2.2435E−03 | 9.8555E−04 |
| R2 | −246.0383 | −2.4676E−02 | 4.3406E−02 | −1.2810E−02 | −7.7013E−03 | 3.3199E−03 | 3.5587E−03 | −1.7611E−03 |
| R3 | −33.1179 | −2.6121E−02 | 2.6747E−02 | 1.0040E−02 | −1.8680E−02 | −1.0820E−03 | 1.1167E−02 | −4.9503E−03 |
| R4 | −10.3084 | 1.7493E−02 | 2.2866E−02 | 4.7757E−03 | −7.3084E−03 | 2.8145E−03 | 1.4199E−03 | 8.1685E−04 |
| R5 | −228.9197 | −4.6764E−03 | −5.1409E−02 | −4.1808E−03 | 2.0405E−02 | −6.8281E−03 | −2.4644E−02 | 1.5112E−02 |
| R6 | −214.4519 | −8.1029E−02 | −2.7488E−02 | 7.1542E−03 | −2.5832E−03 | −1.5600E−03 | 6.3675E−04 | 1.6097E−04 |
| R7 | −73.2785 | −9.4913E−02 | −8.8859E−03 | 4.6845E−03 | 4.5908E−03 | 1.0955E−03 | −3.4470E−04 | −5.4633E−04 |
| R8 | −115.4739 | −7.3602E−02 | −6.0568E−03 | 4.1035E−03 | 1.4956E−03 | −9.3694E−05 | −1.1519E−04 | −6.2440E−05 |
| R9 | −4.3814 | −4.0309E−02 | −2.8499E−02 | −3.9709E−03 | 5.9779E−03 | 1.6723E−03 | −3.9771E−04 | −1.2400E−04 |
| R10 | −2.2628 | −4.5639E−02 | −8.0644E−04 | −1.5164E−03 | 9.5187E−04 | 4.9905E−04 | 9.2572E−05 | −5.5701E−05 |
| R11 | 229.8218 | −4.7424E−02 | 1.0506E−02 | 7.9537E−05 | −1.3655E−03 | 1.0804E−04 | 2.3326E−05 | 1.3278E−06 |
| R12 | −71.4056 | −9.0897E−04 | −4.5644E−03 | 2.0420E−04 | 4.9429E−05 | 2.6967E−06 | −1.0234E−07 | −7.5576E−08 |
| R13 | 5.0157 | −1.4736E−02 | 3.3678E−03 | 1.2506E−05 | −1.8037E−05 | −4.0277E−07 | 7.0534E−08 | 2.0538E−09 |
| R14 | −8.7881 | −3.3506E−02 | 4.9808E−03 | −5.5969E−04 | 2.5486E−05 | 6.3059E−07 | −1.1893E−08 | −5.2663E−09 |

Among them, K is a conic index, A4, A6, A8, A10, A12, A14, A16 are aspheric surface indexes.

IH: Image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16} \quad (1)$$

For convenience, the aspheric surface of each lens surface uses the aspheric surfaces shown in the above condition (1). However, the present invention is not limited to the aspherical polynomials form shown in the condition (1).

Table 3 and table 4 show the inflexion points and the arrest point design data of the camera optical lens 10 lens in embodiment 1 of the present invention. In which, R1 and R2 represent respectively the object side surface and image side surface of the first lens L1, R3 and R4 represent respectively the object side surface and image side surface of the second lens L2, R5 and R6 represent respectively the object side surface and image side surface of the third lens L3, R7 and R8 represent respectively the object side surface and image side surface of the fourth lens L4, R9 and R10 represent respectively the object side surface and image side surface of the fifth lens L5, R11 and R12 represent respectively the object side surface and image side surface of the sixth lens L6, R13 and R14 represent respectively the object side surface and image side surface of the seventh lens L7. The data in the column named "inflexion point position" are the vertical distances from the inflexion points arranged on each lens surface to the optic axis of the camera optical lens 10. The data in the column named "arrest point position" are the vertical distances from the arrest points arranged on each lens surface to the optic axis of the camera optical lens 10.

TABLE 3

| | Inflexion point number | Inflexion point position 1 | Inflexion point position 2 | Inflexion point position 3 |
|---|---|---|---|---|
| R1 | | | | |
| R2 | | | | |
| R3 | | | | |
| R4 | | | | |
| R5 | | | | |
| R6 | 1 | 0.225 | | |
| R7 | 1 | 0.345 | | |
| R8 | 1 | 0.345 | | |
| R9 | 1 | 1.295 | | |
| R10 | 1 | 1.325 | | |
| R11 | 1 | 1.865 | | |
| R12 | 3 | 0.785 | 2.175 | 2.465 |
| R13 | 2 | 1.675 | 2.885 | |
| R14 | 1 | 0.725 | | |

TABLE 4

| | Arrest point number | Arrest point position 1 | Arrest point position 2 |
|---|---|---|---|
| R1 | | | |
| R2 | | | |
| R3 | | | |
| R4 | | | |
| R5 | | | |
| R6 | 1 | 0.385 | |
| R7 | 1 | 0.605 | |
| R8 | 1 | 0.595 | |
| R9 | | | |
| R10 | | | |
| R11 | | | |
| R12 | 1 | 1.235 | |
| R13 | 1 | 2.565 | |
| R14 | 1 | 1.575 | |

Figure 2:
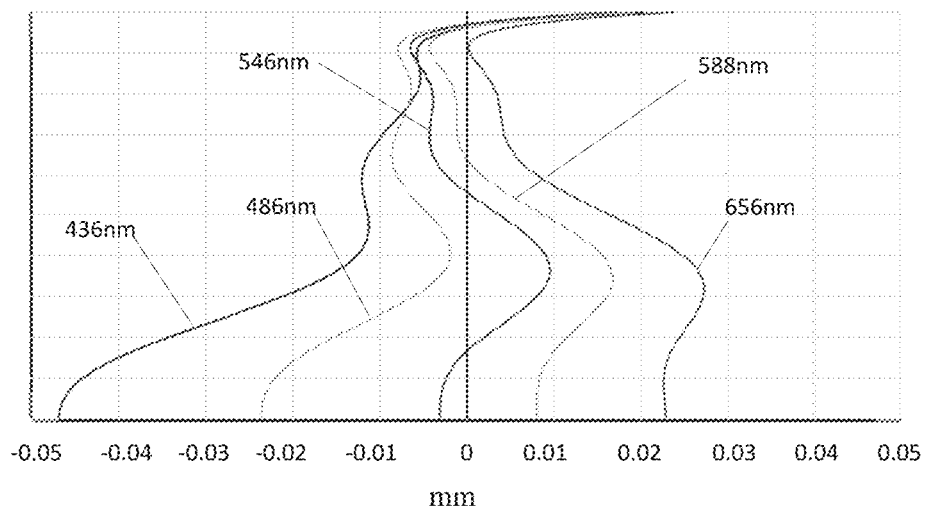
FIG. 2 shows the longitudinal aberration of the camera optical lens shown in FIG. 1.
Figure 3:
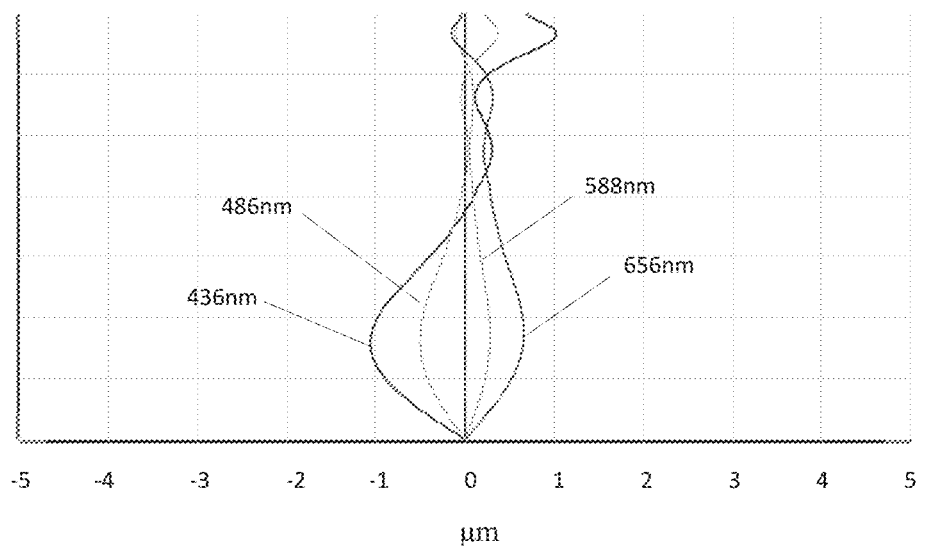
FIG. 3 shows the lateral color of the camera optical lens shown in FIG. 1.
Figure 4:
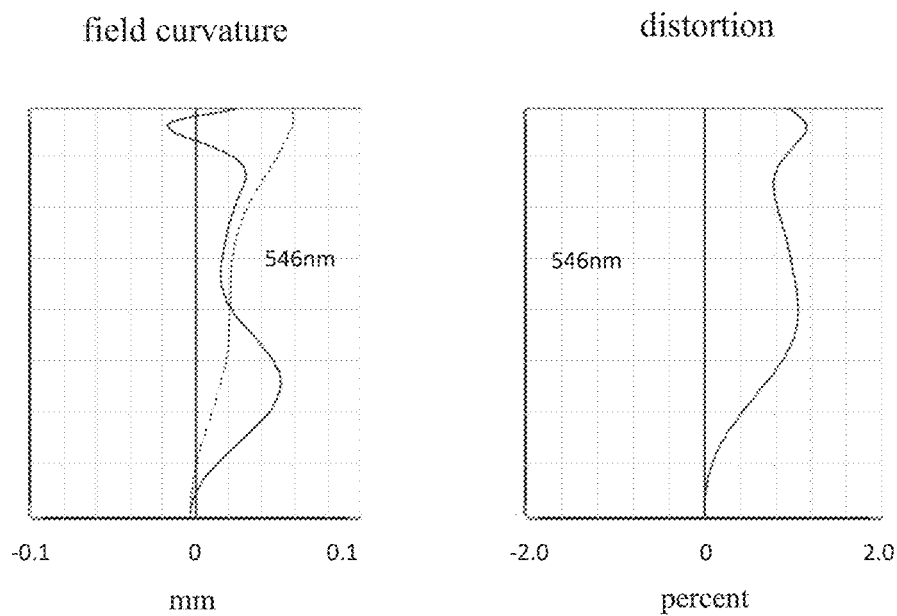
FIG. 4 presents a schematic diagram of the field curvature and distortion of the camera optical lens shown in FIG. 1.
Figure 5:
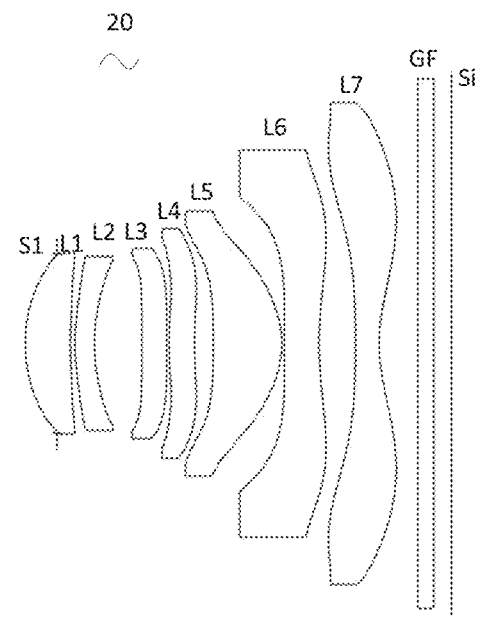
FIG. 5 is a schematic diagram of a camera optical lens in accordance with a second embodiment of the present invention.

FIG. 2 and FIG. 3 show the longitudinal aberration and lateral color schematic diagrams after light with a wavelength of 436 nm、486 nm、546 nm、588 nm and 656 nm passes the camera optical lens 10 in the first embodiment. FIG. 4 shows the field curvature and distortion schematic diagrams after light with a wavelength of 546 nm passes the camera optical lens 10 in the first embodiment, the field curvature S in FIG. 4 is a field curvature in the sagittal direction, T is a field curvature in the meridian direction.

The following Table 13 shows the various values of the embodiments 1, 2, 3 and the values corresponding with the parameters which are already specified in the conditions.

As shown in Table 13, the first embodiment satisfies the various conditions.

In this embodiment, the pupil entering diameter of the camera optical lens is 2.362 mm, the full vision field image height is 3.500 mm, the vision field angle in the diagonal direction is 78.97°, it has wide-angle and is ultra-thin, its on-axis and off-axis chromatic aberrations are fully corrected, and it has excellent optical characteristics.

Embodiment 2

Embodiment 2 is basically the same as embodiment 1, the meaning of its symbols is the same as that of embodiment 1, in the following, only the differences are described.

Table 5 and table 6 show the design data of the camera optical lens 20 in embodiment 2 of the present invention.

TABLE 5

| | R | d | nd | | vd |
|---|---|---|---|---|---|
| S1 | ∞ | d0 = −0.412 | | | |
| R1 | 1.925 | d1 = 0.584 | nd1 | 1.5441 | v1 56.12 |
| R2 | 5.416 | d2 = 0.060 | | | |
| R3 | 2.750 | d3 = 0.250 | nd2 | 1.8902 | v2 21.67 |
| R4 | 2.260 | d4 = 0.615 | | | |
| R5 | −35.436 | d5 = 0.319 | nd3 | 1.5441 | v3 56.12 |
| R6 | −80.873 | d6 = 0.032 | | | |
| R7 | 4.503 | d7 = 0.328 | nd4 | 1.7310 | v4 40.02 |
| R8 | 4.661 | d8 = 0.246 | | | |
| R9 | −9.402 | d9 = 0.882 | nd5 | 1.5352 | v5 56.12 |
| R10 | −1.284 | d10 = 0.031 | | | |
| R11 | 22.099 | d11 = 0.450 | nd6 | 1.5855 | v6 29.91 |
| R12 | 4.257 | d12 = 0.471 | | | |
| R13 | −20.949 | d13 = 0.305 | nd7 | 1.5352 | v7 56.12 |
| R14 | 2.066 | d14 = 0.500 | | | |
| R15 | ∞ | d15 = 0.210 | ndg | 1.5168 | vg 64.17 |
| R16 | ∞ | d16 = 0.229 | | | |

Table 6 shows the aspherical surface data of each lens of the camera optical lens 20 in embodiment 2 of the present invention.

TABLE 6

| | Conic Index | Aspherical Surface Index | | | | | | |
|---|---|---|---|---|---|---|---|---|
| | k | A4 | A6 | A8 | A10 | A12 | A14 | A16 |
| R1 | −0.1185 | 7.5071E−03 | 1.2251E−02 | −9.3932E−03 | 6.3890E−03 | 1.3829E−03 | −2.8371E−03 | 1.1160E−03 |
| R2 | −244.1022 | −3.4812E−02 | 5.2721E−02 | −1.5255E−02 | −1.1118E−02 | 4.0882E−03 | 5.1648E−03 | −2.4299E−03 |
| R3 | −30.5663 | −2.3353E−02 | 2.0224E−02 | 1.0015E−02 | −1.6725E−02 | −1.1067E−03 | 1.0393E−02 | −4.2116E−03 |
| R4 | −8.2862 | 7.4843E−03 | 1.6295E−02 | 7.9872E−03 | −4.7399E−03 | 2.8401E−04 | −1.9066E−04 | 2.7627E−03 |
| R5 | 228.8702 | 2.3073E−02 | −7.8543E−03 | 9.7796E−04 | 2.6921E−02 | −1.0389E−02 | −2.6939E−02 | 1.6820E−02 |
| R6 | 161.6682 | −2.5193E−02 | −3.8235E−03 | 3.5846E−03 | −2.1624E−03 | −1.2104E−03 | 8.3505E−04 | 6.2395E−05 |
| R7 | −55.6892 | −8.3061E−02 | 3.4200E−03 | 2.9898E−03 | 2.6649E−03 | 6.7076E−04 | −2.0818E−04 | −4.1788E−04 |
| R8 | −49.4917 | −7.3815E−02 | −1.0190E−02 | 2.7608E−03 | 2.0124E−03 | 3.4495E−04 | −2.6643E−05 | −1.3578E−04 |
| R9 | −38.3149 | −3.0457E−02 | −3.3142E−02 | −4.5899E−03 | 6.4159E−03 | 1.8756E−03 | −3.6923E−04 | −1.5588E−04 |
| R10 | −2.5307 | −4.4617E−02 | 1.2685E−03 | −1.2574E−03 | 8.7775E−04 | 4.7903E−04 | 8.5792E−05 | −6.0064E−05 |
| R11 | −35.0466 | −6.4961E−02 | 1.1143E−02 | −6.8077E−05 | −1.2874E−03 | 1.2948E−04 | 2.6300E−05 | −4.7169E−07 |
| R12 | −34.3016 | −1.0062E−02 | −2.8374E−03 | 2.3024E−04 | 2.9239E−05 | 7.5871E−07 | −2.9373E−08 | −2.9615E−08 |
| R13 | 45.2589 | −2.6930E−02 | 4.3242E−03 | 3.5340E−05 | −2.1229E−05 | −7.6069E−07 | 6.1723E−08 | 4.3677E−09 |
| R14 | −7.8671 | −3.3877E−02 | 5.0303E−03 | −5.3696E−04 | 2.8630E−05 | 3.1911E−07 | −1.8135E−08 | −5.6110E−09 |

Table 7 and table 8 show the inflexion points and the arrest point design data of the camera optical lens 20 lens in embodiment 2 of the present invention.

TABLE 7

| | Inflexion point number | Inflexion point position 1 | Inflexion point position 2 |
|---|---|---|---|
| R1 | | | |
| R2 | | | |
| R3 | | | |
| R4 | | | |
| R5 | | | |
| R6 | | | |
| R7 | 1 | 0.375 | |
| R8 | 1 | 0.395 | |
| R9 | 2 | 1.265 | 1.525 |
| R10 | 2 | 1.305 | 1.705 |
| R11 | 2 | 0.245 | 1.845 |
| R12 | 2 | 0.735 | 2.175 |
| R13 | 2 | 1.735 | 2.825 |
| R14 | 1 | 0.755 | |

TABLE 8

| | Arrest point number | Arrest point position 1 | Arrest point position 2 |
|---|---|---|---|
| R1 | | | |
| R2 | | | |
| R3 | | | |
| R4 | | | |
| R5 | | | |
| R6 | | | |
| R7 | 1 | 0.685 | |
| R8 | 1 | 0.685 | |
| R9 | | | |
| R10 | | | |
| R11 | 1 | 0.425 | |
| R12 | 1 | 1.335 | |
| R13 | 1 | 2.535 | |
| R14 | 1 | 1.625 | |

Figure 6:
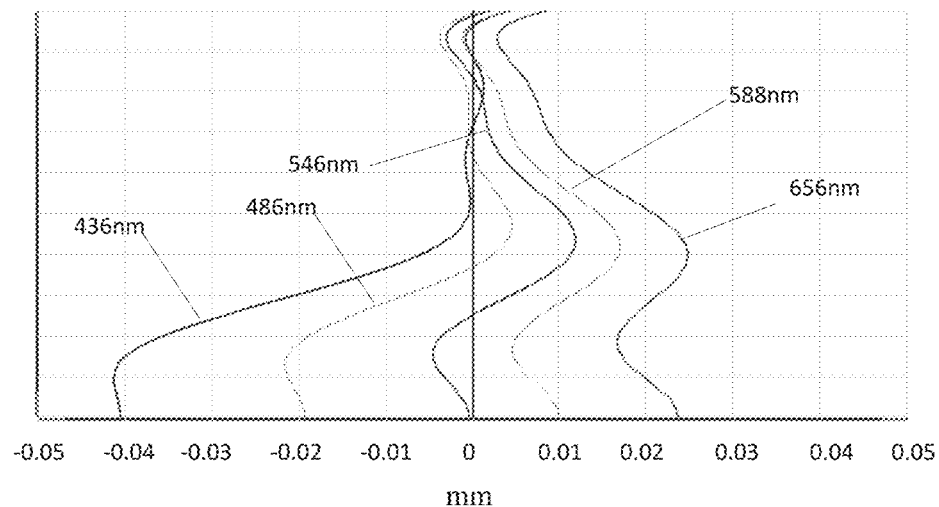
FIG. 6 presents the longitudinal aberration of the camera optical lens shown in FIG. 5.
Figure 7:
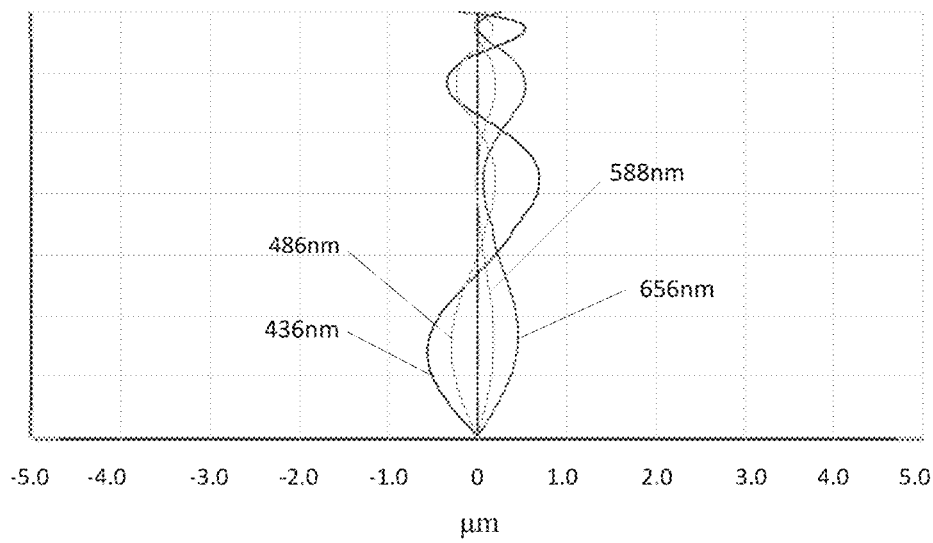
FIG. 7 presents the lateral color of the camera optical lens shown in FIG. 5.
Figure 8:
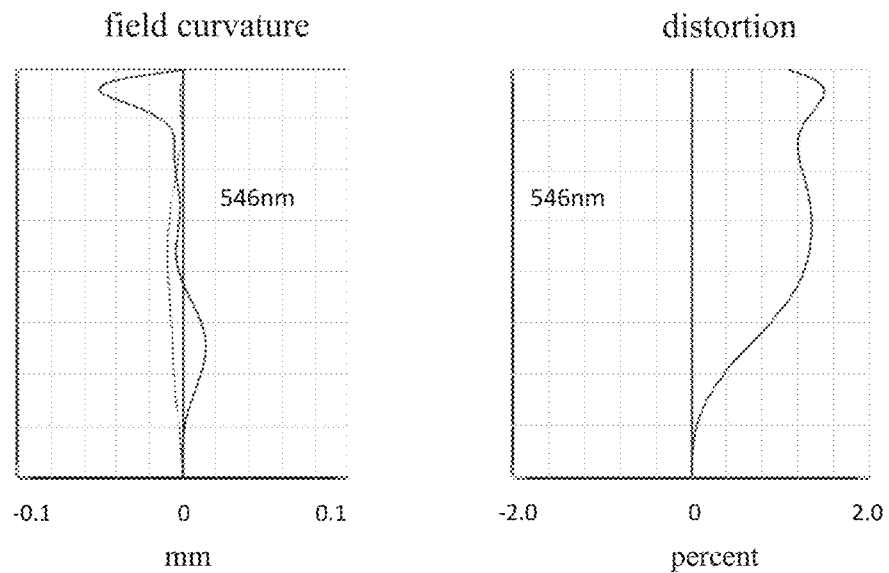
FIG. 8 presents the field curvature and distortion of the camera optical lens shown in FIG. 5.
Figure 9:
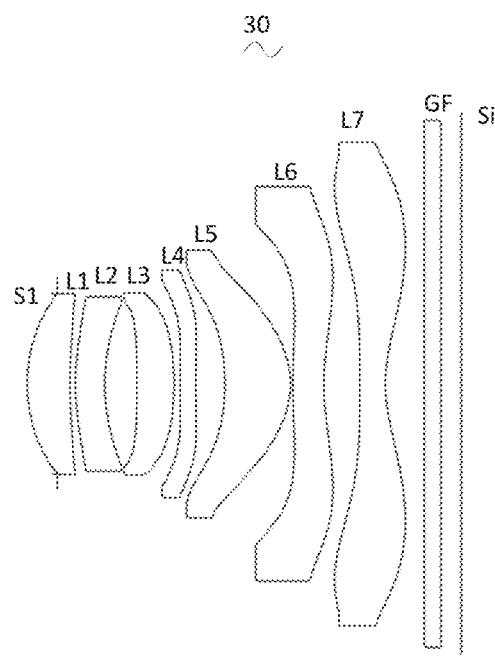
FIG. 9 is a schematic diagram of a camera optical lens in accordance with a third embodiment of the present invention.

FIG. 6 and FIG. 7 show respectively the longitudinal aberration and lateral color schematic diagrams after light with a wavelength of 436 nm、486 nm、546 nm、588 nm and 656 nm passes the camera optical lens 20 in the second embodiment. FIG. 8 shows the field curvature and distortion schematic diagrams after light with a wavelength of 546 nm passes the camera optical lens 20 in the second embodiment.

As shown in Table 13, the second embodiment satisfies the various conditions.

In this embodiment, the pupil entering diameter of the camera optical lens is 2.321 mm, the full vision field image height is 3.500 mm, the vision field angle in the diagonal direction is 79.94°, it has wide-angle and is ultra-thin, its on-axis and off-axis chromatic aberrations are fully corrected, and it has excellent optical characteristics.

Embodiment 3

Embodiment 3 is basically the same as embodiment 1, the meaning of its symbols is the same as that of embodiment 1, in the following, only the differences are described.

Table 9 and table 10 show the design data of the camera optical lens 30 in embodiment 3 of the present invention.

TABLE 9

| | R | d | nd | vd |
|---|---|---|---|---|
| S1 | ∞ | d0 = −0.384 | | |
| R1 | 2.025 | d1 = 0.548 | nd1 1.5441 | v1 56.12 |
| R2 | 5.002 | d2 = 0.069 | | |
| R3 | 2.846 | d3 = 0.376 | nd2 1.9611 | v2 21.97 |
| R4 | 2.343 | d4 = 0.413 | | |
| R5 | −17.047 | d5 = 0.476 | nd3 1.5352 | v3 56.12 |
| R6 | −3.495 | d6 = 0.076 | | |
| R7 | 14.410 | d7 = 0.204 | nd4 1.8202 | v4 21.67 |
| R8 | 8.995 | d8 = 0.373 | | |
| R9 | −2.656 | d9 = 0.841 | nd5 1.5352 | v5 56.12 |
| R10 | −1.108 | d10 = 0.031 | | |
| R11 | 8.227 | d11 = 0.398 | nd6 1.5855 | v6 29.91 |
| R12 | 3.235 | d12 = 0.458 | | |
| R13 | −52.210 | d13 = 0.328 | nd7 1.5352 | v7 56.12 |
| R14 | 1.899 | d14 = 0.500 | | |
| R15 | ∞ | d15 = 0.210 | ndg 1.5168 | vg 64.17 |
| R16 | ∞ | d16 = 0.262 | | |

Table 10 shows the aspherical surface data of each lens of the camera optical lens 30 in embodiment 3 of the present invention.

TABLE 10

| | Conic Index | Aspherical Surface Index | | | | | | |
|---|---|---|---|---|---|---|---|---|
| | k | A4 | A6 | A8 | A10 | A12 | A14 | A16 |
| R1 | −0.1352 | 6.6629E−03 | 1.0240E−02 | −8.8587E−03 | 6.5064E−03 | 1.3599E−03 | −2.9721E−03 | 1.1331E−03 |
| R2 | −109.3465 | −5.2109E−02 | 6.4177E−02 | −1.7333E−02 | −1.2661E−02 | 4.9717E−03 | 5.3529E−03 | −2.6190E−03 |
| R3 | −21.0451 | −2.4504E−02 | 1.7305E−02 | 1.1638E−02 | −1.8184E−02 | −2.3408E−03 | 1.1207E−02 | −4.1533E−03 |
| R4 | −5.5892 | 4.3058E−03 | 9.8935E−03 | 3.5585E−03 | −4.7060E−03 | −2.0252E−04 | −3.2642E−04 | 1.2809E−03 |
| R5 | 191.7988 | −1.3563E−02 | −3.5673E−02 | −1.7799E−02 | 8.4489E−03 | −4.8501E−03 | −2.0059E−02 | 8.7674E−03 |
| R6 | 6.1472 | −2.0026E−02 | −3.9274E−02 | 9.1745E−03 | −1.7091E−04 | −2.5232E−03 | −7.5052E−04 | 1.0188E−03 |
| R7 | −94.6719 | −1.0754E−01 | −1.2160E−02 | 5.9558E−04 | 5.8307E−03 | 3.5639E−03 | 4.7626E−04 | −1.3687E−03 |
| R8 | −76.2879 | −8.6122E−02 | −7.4437E−03 | 4.2503E−03 | 2.4281E−03 | 3.9622E−04 | −1.1123E−05 | −1.6282E−04 |
| R9 | −0.7512 | −3.4191E−02 | −1.3873E−02 | 3.8188E−04 | 6.0018E−03 | 1.0441E−03 | −5.9055E−04 | −5.9804E−05 |
| R10 | −2.7384 | −7.3104E−02 | 1.0505E−02 | −7.7694E−04 | 3.0408E−04 | 4.1507E−04 | 1.0385E−04 | −5.5575E−05 |
| R11 | 5.6803 | −5.1381E−02 | 5.7503E−03 | 3.0957E−04 | −9.9864E−04 | 1.5439E−04 | 1.1980E−05 | −2.0074E−06 |
| R12 | −24.9369 | −1.4740E−02 | −1.8937E−03 | 1.1146E−04 | 2.5246E−05 | 3.2615E−06 | 9.1720E−08 | −7.2614E−08 |
| R13 | 276.6256 | −2.7952E−02 | 3.9878E−03 | 3.4004E−05 | −1.9336E−05 | −4.1638E−07 | 7.7305E−08 | 2.6794E−10 |
| R14 | −8.1582 | −3.1606E−02 | 5.5259E−03 | −6.1933E−04 | 2.3962E−05 | 5.4470E−07 | 1.4106E−08 | −3.5253E−09 |

Table 11 and table 12 show the inflexion points and the arrest point design data of the camera optical lens 30 lens in embodiment 3 of the present invention.

TABLE 11

| | Inflexion point number | Inflexion point position 1 | Inflexion point position 2 |
|---|---|---|---|
| R1 | | | |
| R2 | | | |
| R3 | | | |
| R4 | | | |
| R5 | | | |
| R6 | | | |
| R7 | 1 | 0.235 | |
| R8 | 1 | 0.315 | |
| R9 | 2 | 1.175 | 1.515 |
| R10 | 1 | 1.315 | |
| R11 | 2 | 0.475 | 1.965 |
| R12 | 2 | 0.705 | 2.185 |
| R13 | 1 | 1.805 | |
| R14 | 2 | 0.765 | 2.865 |

TABLE 12

| | Arrest point number | Arrest point position 1 | Arrest point position 2 |
|---|---|---|---|
| R1 | | | |
| R2 | | | |
| R3 | | | |
| R4 | | | |
| R5 | | | |
| R6 | | | |
| R7 | 1 | 0.395 | |
| R8 | 1 | 0.525 | |
| R9 | | | |
| R10 | | | |
| R11 | 1 | 0.825 | |
| R12 | 1 | 1.345 | |
| R13 | 1 | 2.525 | |
| R14 | 1 | 1.765 | |

Figure 10:
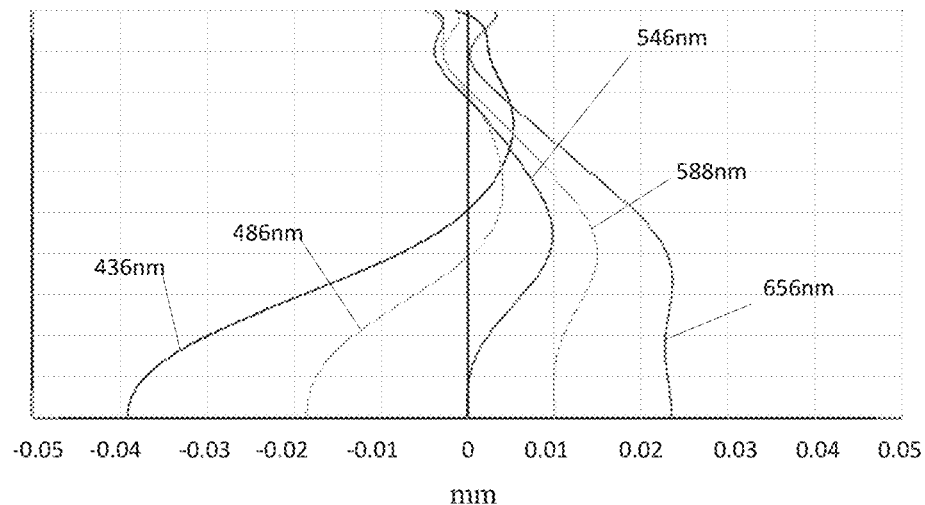
FIG. 10 presents the longitudinal aberration of the camera optical lens shown in FIG. 9.
Figure 11:
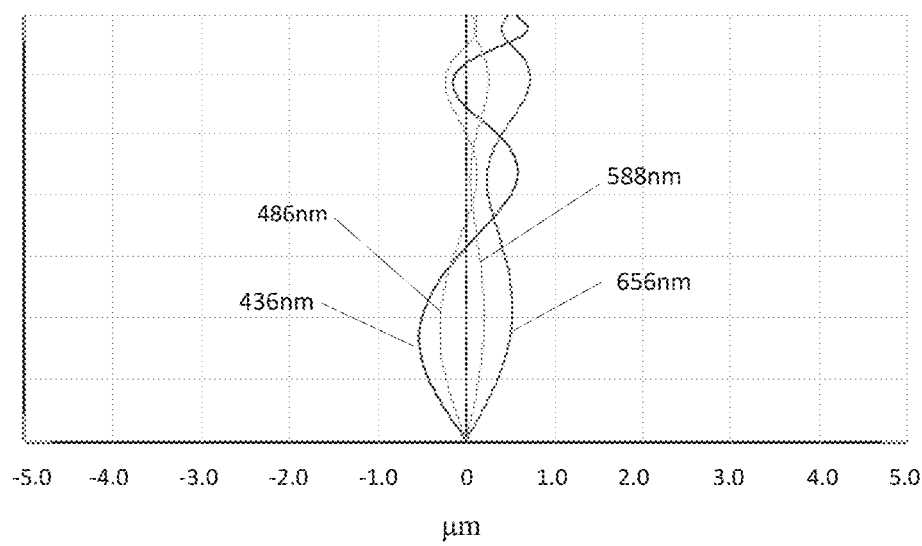
FIG. 11 presents the lateral color of the camera optical lens shown in FIG. 9.
Figure 12:
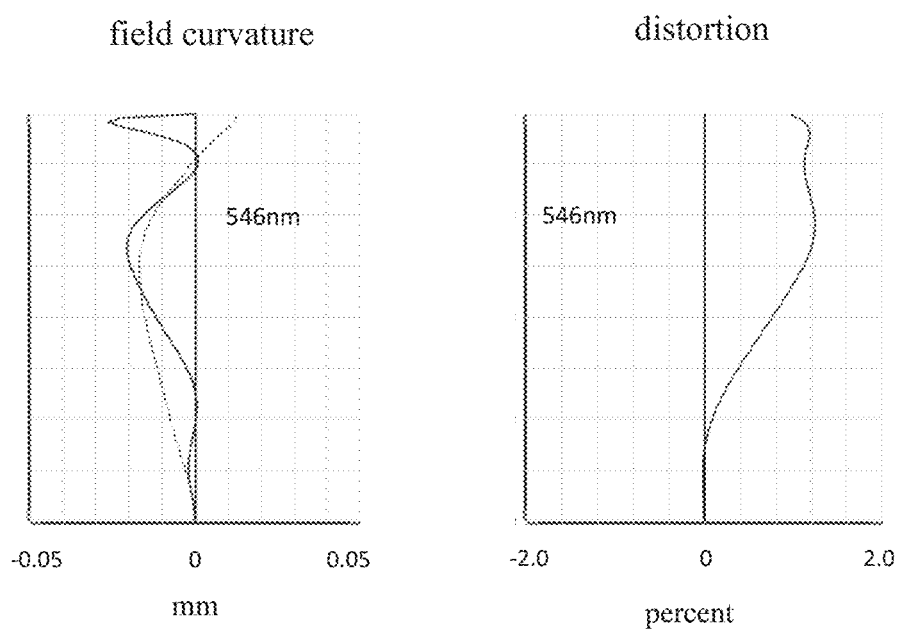
FIG. 12 presents the field curvature and distortion of the camera optical lens shown in FIG. 9.

FIG. 10 and FIG. 11 show respectively the longitudinal aberration and lateral color schematic diagrams after light with a wavelength of 436 nm、486 nm、546 nm、588 nm and 656 nm passes the camera optical lens 30 in the third embodiment. FIG. 12 shows the field curvature and distortion schematic diagrams after light with a wavelength of 546 nm passes the camera optical lens 30 in the third embodiment.

The following Table 13 shows the values corresponding with the conditions in this embodiment according to the above conditions. Obviously, the camera optical system in this embodiment satisfies the above conditions.

In this embodiment, the pupil entering diameter of the camera optical lens is 2.312 mm, the full vision field image height is 3.480 mm, the vision field angle in the diagonal direction is 79.88°, it has wide-angle and is ultra-thin, its on-axis and off-axis chromatic aberrations are fully corrected, and it has excellent optical characteristics.

TABLE 13

| | Embodiment 1 | Embodiment 2 | Embodiment 3 |
|---|---|---|---|
| f | 4.204 | 4.127 | 4.107 |
| f1 | 4.835 | 5.158 | 5.830 |
| f2 | −15.116 | −22.856 | −44.045 |
| f3 | −27.962 | −15.296 | −17.403 |
| f4 | 18.208 | 12.716 | 19.241 |
| f5 | 2.837 | 2.815 | 2.647 |
| f6 | −15.441 | −12.684 | −7.995 |
| f7 | −2.928 | −3.052 | −3.618 |
| f3/f4 | −1.536 | −1.203 | −0.904 |
| (R1 + R2)/(R1 − R2) | −1.947 | −2.103 | −2.360 |
| (R3 + R4)/(R3 − R4) | 7.948 | 10.231 | 10.309 |
| (R5 + R6)/(R5 − R6) | 0.640 | −2.560 | 1.516 |
| (R7 + R8)/(R7 − R8) | −5.614 | −58.271 | 4.322 |
| (R9 + R10)/(R9 − R10) | 1.453 | 1.316 | 2.431 |
| (R11 + R12)/(R11 − R12) | 0.404 | 1.477 | 2.296 |
| (R13 + R14)/(R13 − R14) | 0.593 | 0.820 | 0.930 |
| f1/f | 1.150 | 1.250 | 1.419 |
| f2/f | −3.596 | −5.538 | −10.724 |
| f3/f | −6.651 | −3.706 | −4.237 |
| f4/f | 4.331 | 3.081 | 4.685 |
| f5/f | 0.675 | 0.682 | 0.644 |
| f6/f | −3.673 | −3.073 | −1.947 |
| f7/f | −0.696 | −0.740 | −0.881 |
| d1 | 0.597 | 0.584 | 0.548 |
| d3 | 0.256 | 0.250 | 0.376 |
| d5 | 0.361 | 0.319 | 0.476 |
| d7 | 0.300 | 0.328 | 0.204 |
| d9 | 0.852 | 0.882 | 0.841 |
| d11 | 0.398 | 0.450 | 0.398 |
| d13 | 0.349 | 0.305 | 0.328 |
| Fno | 1.780 | 1.778 | 1.776 |
| TTL | 5.056 | 5.072 | 5.091 |
| d7/TTL | 0.059 | 0.065 | 0.040 |
| n1 | 1.5441 | 1.5441 | 1.5441 |
| n2 | 1.7127 | 1.8902 | 1.9611 |
| n3 | 1.5441 | 1.5441 | 1.5352 |
| n4 | 1.8012 | 1.7310 | 1.8202 |
| n5 | 1.5352 | 1.5352 | 1.5352 |
| n6 | 1.5855 | 1.5855 | 1.5855 |
| n7 | 1.5352 | 1.5352 | 1.5352 |

Persons of ordinary skill in the related art can understand that, the above embodiments are specific examples for implementation of the present disclosure, and during actual application, various changes may be made to the forms and details of the examples without departing from the spirit and scope of the present disclosure.

What is claimed is:

1. A camera optical lens comprising, from an object side to an image side in sequence: a first lens, a second lens, a third lens, a fourth lens, a fifth lens, a sixth lens and a seventh lens;

Wherein the first lens is made of plastic material, the second lens is made of glass material, the third lens is made of plastic material, the fourth lens is made of glass material, the fifth lens is made of plastic material, the sixth lens is made of plastic material, and the seventh lens is made of plastic material;

wherein the camera optical lens further satisfies the following conditions:

$$1 \leq f1/f \leq 1.5;$$

$$1.7 \leq n2 \leq 2.2$$

$$6.36 \leq (R3+R4)/(R3-R4) \leq 12.37;$$

$$-2 \leq f3/f4 \leq 2;$$

$$-13.30 \leq f3/f \leq -2.47;$$

$$-5.12 \leq (R5+R6)/(R5-R6) \leq 2.27;$$

$$0.16 \text{ mm} \leq d5 \leq 0.71 \text{ mm};$$

$$0.5 \leq (R13+R14)/(R13-R14) \leq 10;$$

$$1.7 \leq n4 \leq 2.2;$$

where f: the focal length of the camera optical lens;
f1: the focal length of the first lens;
f3: the focal length of the third lens;
f4: the focal length of the fourth lens;
n2: the refractive index of the second lens;
n4: the refractive index of the fourth lens;
R3: the curvature radius of the object side surface of the second lens;
R4: the curvature radius of the image side surface of the second lens;
R5: the curvature radius of the object side surface of the third lens;
R6: the curvature radius of the image side surface of the third lens;
d5: the thickness on-axis of the third lens;
R13: the curvature radius of object side surface of the seventh lens;
R14: the curvature radius of image side surface of the seventh lens.

2. The camera optical lens according to claim 1 further satisfying the following conditions:

$$1.08 \leq f1/f \leq 1.46;$$

$$1.71 \leq n2 \leq 2.08;$$

$$-1.77 \leq f3/f4 \leq 0.55;$$

$$0.55 \leq (R13+R14)/(R13-R14) \leq 5.47;$$

$$1.72 \leq n4 \leq 2.01.$$

3. The camera optical lens according to claim 1, wherein the first lens has a positive refractive power with a convex object side surface and a concave image side surface relative to a proximal axis; the camera optical lens further satisfies the following conditions:

$$-4.72 \leq (R1+R2)/(R1-R2) \leq -1.30; \text{ and,}$$

$$0.27 \text{ mm} \leq d1 \leq 0.90 \text{ mm; where}$$

R1: the curvature radius of object side surface of the first lens;
R2: the curvature radius of image side surface of the first lens;
d1: the thickness on-axis of the first lens.

4. The camera optical lens according to claim 3 further satisfying the following conditions:

$$-2.95 \leq (R1+R2)/(R1-R2) \leq -1.62; \text{ and,}$$

$$0.44 \text{ mm} \leq d1 \leq 0.72 \text{ mm}.$$

5. The camera optical lens according to claim 1, wherein the second lens has a negative refractive power with a convex object side surface and a concave image side surface relative to a proximal axis; the camera optical lens further satisfies the following conditions:

$$-21.45 \leq f2/f \leq -2.40;$$

$$0.13 \text{ mm} \leq d3 \leq 0.56 \text{ mm; where}$$

f: the focal length of the camera optical lens;
f2: the focal length of the second lens;
d3: the thickness on-axis of the second lens.

6. The camera optical lens according to claim 5 further satisfying the following condition:

$$-13.41 \leq f2/f \leq -3.0;$$

$$0.20 \text{ mm} \leq d3 \leq 0.45 \text{ mm}.$$

7. The camera optical lens according to claim 6 further satisfying the following conditions:

$$-8.31 \leq f3/f \leq -3.09;$$

$$-3.20 \leq (R5+R6)/(R5-R6) \leq 1.82; \text{ and,}$$

$$0.26 \text{ mm} \leq d5 \leq 0.57 \text{ mm}.$$

8. The camera optical lens according to claim 1, wherein the fourth lens has a positive refractive power with a convex object side surface and a concave image side surface relative to a proximal axis; the camera optical lens further satisfies the following conditions:

$$1.54 \leq f4/f \leq 7.03;$$

$$-116.54 \leq (R7+R8)/(R7-R8) \leq 6.48; \text{ and,}$$

$$0.10 \text{ mm} \leq d7 \leq 0.49 \text{ mm; where}$$

f: the focal length of the camera optical lens;
f4: the focal length of the fourth lens;
R7: the curvature radius of the object side surface of the fourth lens;
R8: the curvature radius of the image side surface of the fourth lens;
d7: the thickness on-axis of the fourth lens.

9. The camera optical lens according to claim 8 further satisfying the following conditions:

$$2.46 \leq f4/f \leq 5.62;$$

$$-72.84 \leq (R7+R8)/(R7-R8) \leq 5.19; \text{ and,}$$

$$0.16 \text{ mm} \leq d7 \leq 0.39 \text{ mm}.$$

10. The camera optical lens according to claim 1, wherein the fifth lens has a positive refractive power with a concave object side surface and a convex image side surface relative to a proximal axis; the camera optical lens further satisfies the following conditions:

$0.32 \leq f5/f \leq 1.02;$ $0.66 \leq (R9+R10)/(R9-R10) \leq 3.65;$ and, $0.42 \text{ mm} \leq d9 \leq 1.32 \text{ mm};$ where f: the focal length of the camera optical lens;
f5: the focal length of the fifth lens;
R9: the curvature radius of the object side surface of the fifth lens;
R10: the curvature radius of the image side surface of the fifth lens;
d9: the thickness on-axis of the fifth lens.

11. The camera optical lens according to claim 10 further satisfying the following conditions:

$0.52 \leq f3/f \leq 0.82;$ $1.05 \leq (R9+R10)/(R9-R10) \leq 2.92;$ and, $0.67 \text{ mm} \leq d9 \leq 1.06 \text{ mm}.$ 12. The camera optical lens according to claim 1, wherein the sixth lens has a negative refractive power with a concave image side surface relative to a proximal axis; the camera optical lens further satisfies the following conditions:

$-7.35 \leq f6/f \leq -1.30;$ $0.20 \leq (R11+R12)/(R11-R12) \leq 3.44;$ and, $0.20 \text{ mm} \leq d11 \leq 0.67 \text{ mm};$ where f: the focal length of the camera optical lens;
f6: the focal length of the sixth lens;
R11: the curvature radius of the object side surface of the sixth lens;
R12: the curvature radius of the image side surface of the sixth lens;
d11: the thickness on-axis of the sixth lens.

13. The camera optical lens according to claim 12 further satisfying the following conditions:

$-4.59 \leq f6/f \leq -1.62;$ $0.32 \leq (R11+R12)/(R11-R12) \leq 2.76;$ and, $0.32 \text{ mm} \leq d11 \leq 0.54 \text{ mm}.$ 14. The camera optical lens according to claim 1, wherein the seventh lens has a negative refractive power with a concave object side surface and a concave image side surface relative to a proximal axis; the camera optical lens further satisfies the following conditions:

$-1.76 \leq f7/f \leq -0.46;$ and, $0.15 \text{ mm} \leq d13 \leq 0.52 \text{ mm};$ where f: the focal length of the camera optical lens;
f7: the focal length of the seventh lens;
d13: the thickness on-axis of the seventh lens.

15. The camera optical lens according to claim 14 further satisfying the following conditions:

$-1.10 \leq f7/f \leq -0.58;$ and, $0.24 \text{ mm} \leq d13 \leq 0.42 \text{ mm}.$ 16. The camera optical lens according to claim 1, wherein the total optical length TTL of the camera optical lens is less than or equal to 5.60 mm; where TTL: the total optical length from the object side surface of the first lens to the image surface.

17. The camera optical lens according to claim 16, wherein the total optical length TTL of the camera optical lens is less than or equal to 5.35 mm.

18. The camera optical lens according to claim 1, wherein the aperture F number of the camera optical lens is less than or equal to 1.83.

19. The camera optical lens according to claim 18, wherein the aperture F number of the camera optical lens is less than or equal to 1.80.

* * * * *